United States Patent Office 3,522,312
Patented July 28, 1970

3,522,312
DISULFIDES PRODUCED BY THE OXIDATION OF DITHIOLS WITH DIALKYL SULFOXIDES
Jack E. Reece, Bartlesville, Okla., assignor to Phillips Petroleum Company, a corporation of Delaware
No Drawing. Filed Feb. 14, 1967, Ser. No. 615,913
Int. Cl. C07c 149/26; C08g 23/00
U.S. Cl. 260—608     4 Claims

ABSTRACT OF THE DISCLOSURE

Organo disulfide polymers having linkages of two sulfur atoms by a reaction at elevated temperature of dithiol and dialkyl sulfoxide, the polymers obtained having the sulfur atoms in regular sequence in the linkages and being low molecular weight liquid or semi-solid polymers and/or higher molecular weight rubbery polymers having molecular weights up to and including 1000 to 5000 or more. In a further modification a minor amount of one or more polyfunctional mercapto esters or mercaptans are used to provide cross linking sites to improve cure and bond strengths or reactivity of the ultimate polymers produced.

---

This invention relates to the production of organo-disulfide polymers. More particularly, it relates to production of organo-disulfide polymers in which substantially all disulfide linkages are composed of only two joined sulfur atoms.

In one of its aspects, the invention relates to a process for the production of organo-disulfide polymers. In another of its aspects, the invention relates to the organo-disulfide polymers produced.

In one of the concepts of the invention, an organo-disulfide polymer having substantially only 2 joined sulfur atoms in a regular sequence in the disulfide linkages is produced by a reaction at an elevated temperature obtained upon contacting a dithiol and a dialkyl sulfoxide which acts both as a solvent and as an oxidizing agent. In another concept of the invention, there are obtained novel polymers which can be low molecular weight liquid or semi-solid polymers and/or higher molecular weight rubbery polymers having molecular weights ranging up to and including 1000–5000 or more. In a further concept of the invention, there is employed with a dithiol, i.e., a dimercaptan, for copolymerization therewith, a minor amount of up to the order of about 10–15, at present about 1–5 weight percent based on the amount of the dithiol charged, to obtain a more highly cross-linked polymer, one or more polyfunctional mercapto esters or mercaptans to provide cross-linking sites to advantageously considerably improve the cured and bond strengths or reactivity of the ultimate polymers produced.

The oxidation of mono- as distinguished from dithiols using dimethyl sulfoxide is reported in Journal of Organic Chemistry 28, 3246 (1963).

I have now discovered that organo-disulfide polymers are produced according to a reaction which can be represented by the following equation:

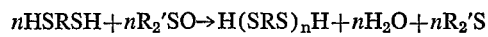

$n\text{HSRSH} + n\text{R}_2'\text{SO} \rightarrow \text{H(SRS)}_n\text{H} + n\text{H}_2\text{O} + n\text{R}_2'\text{S}$ in which R is alkylene, arylene, cycloalkylene, or combinations of these such as aralkylene and alkarylene having 5–20 carbon atoms, R' is methyl or ethyl, and the thiol groups are separated by a hereinafter described number of carbon atoms, when a dithiol and a dialkyl sulfoxide, such as dimethyl sulfoxide, are brought together at an elevated temperature, for example a temperature in the approximate range of 95–170° C. and as further described below. The dimethyl sulfoxide acts as an oxidizing agent and can also act as solvent.

An object of this invention is to produce a sulfur-containing polymer. Another object of the invention is to produce a sulfur-containing polymer useful as an adhesive or as an adhesive adjuvant. A further object of the invention is to produce liquid or semi-solid or solid rubbery polymers containing sulfur and which are of a character such that they can be cured. Still another object of the invention is to provide a process for the production of an organo-disulfide polymer. A further object of the invention is to provide a process for the production of a sulfur-containing polymer employing a reactant which acts both as solvent and as oxidant. A still further object of the invention is to produce a sulfur-containing polymer which is composed substantially of disulfide linkages having only two joined sulfur atoms. A still further object of the invention is to produce a sulfur-containing polymer which is composed substantially of disulfide linkages having only two joined sulfur atoms appearing in regular sequence.

Other concepts, objects and the several advantages of the invention are apparent from a study of this disclosure and the appended claims of the invention.

The products of the invention are particularly useful as adhesives or adhesive adjuvants, and this is more especially so when a cross-linking comonomer, as described hereinafter, is used.

The thiols which are applicable for use in the present invention are aliphatic dithiols having from 7 to about 20 carbon atoms per molecule and cycloaliphatic, aromatic, alkyl-substituted cycloaliphatic, and alkyl-substituted aromatic dithiols, each cyclic dithiol having 0 to about 4 alkyl groups per molecule, each alkyl group having from 1 to about 12 carbon atoms, each cyclic dithiol having from 5 to about 20 carbon atoms per molecule, and wherein both thiol groups can be on ring carbons, both on chain carbons, or one on a ring and the other on a chain, and wherein the two thiol groups are separated, in the shortest carbon atom linkage between the two thiol groups, by at least one of the following:

(a) at least 7 chain carbon atoms,
(b) at least 3 ring carbon atoms, or
(c) at least 7 carbon atoms which can be a combination of ring and chain carbon atoms.

Representative of the foregoing are the following compounds:

4-(2-mercaptoethyl)cyclohexanethiol
3-(2-mercaptoethyl)cyclohexanethiol
1,8-octanedithiol
1,12-dodecanedithiol
1,3-dimercaptobenzene
1,4-dimercaptobenzene
1,3-cyclohexanedithiol
1,4-cyclohexanedithiol
3,5,10-trimethyl-2,10-dodecanedithiol
1,7-octanedithiol
1,4-bis(2-mercaptoethyl)benzene
2,5-toluenedithiol
4-mercaptobenzylthiol
1,20-eicosanedithiol
1,3-cyclopentanedithiol
p-xylene-α,α'-dithiol The dithiol monomers can also be used as mixtures. The first two are commercially obtained as an isomeric mixture which can be used. Although secondary and tertiary thiols can be used, primary thiols are preferred because of greater reactivity.

Sulfoxides which are included for use in this invention are dimethyl sulfoxide, diethyl sulfoxide, methyl ethyl sulfoxide and mixtures thereof.

The monomer concentration in the monomer-sulfoxide reaction mixture ordinarily should be relatively high initially, e.g., about 10–25 percent by weight, preferably about 12–18 percent. For high conversions, however, at least one mole of the sulfoxide is present for each mole of monomer. Thus, the solvent-oxidant is heated to the reaction temperature and sufficient monomer added at once to attain a desired concentration thereof. In a continuous process, the feed streams are adjusted to maintain this concentration range as these streams are brought together.

The temperature at which the reaction is conducted is now preferred to be in the approximate range of from about 95–170° C., preferably from about 130 to about 165° C., a temperature of 150° C. being now thought to be nearly optimum.

Dimethyl sulfoxide boils at 190° C. with decomposition, and a reaction temperature of about 170° C. is about maximum if decomposition of the dimethyl sulfoxide is to be avoided, although polymerization at higher temperatures is still possible.

The reaction time will vary depending upon the temperature, the dithiol charge, and the desired molecular weight as well as other factors as one skilled in the art in possession of this disclosure having studied the same will understand. The optimum conditions for each monomer and/or product desired can be determined by him by mere routine testing.

Generally, the reaction time will vary from a few minutes to several hours, preferably from about 30 minutes to about 5 hours.

The invention is not intended to be limited in its broad aspect to conditions which have been given and which are now thought to be optimum or are preferred conditions. Thus, although a polymer compound of substantially disulfide linkages appearing in regular sequence is produced when a single thiol is used, it is possible to form other than said polymer when the thiol reactant is not limted to a single thiol, i.e. mixtures are used as earlier described.

Air can be blown through the reactor since this appears to benefit the reaction by removing water. In any event, the reaction is conducted at essentially atmospheric pressure such as in a vented vessel. Operation in pressure vessels at higher pressures is possible, but no advantage is seen in this.

According to the present invention, there is provided a process for producing a sulfur-containing polymer which comprises contacting a dithiol and a dialkyl sulfoxide at an elevated temperature. In a preferred embodiment of the invention, the entire charges of reactants are brought together substantially simultaneously as in a batch operation or at once as in a continuous operation in an amount and in a proportion such that the desired reaction will ensue.

Still, according to the invention, there is provided a novel sulfur-containing polymer having sulfide linkages composed of only two sulfur atoms.

Further, according to the invention there is provided a novel sulfur-containing polymer in which there appears in regular sequence sulfide linkages composed of only two sulfur atoms.

When a comonomer or modifier is used, one or more of the following can be included in the recipe.

Esters of mercapto-acids and polyfunctional alcohols such as:

glycerol triester of β-mercapto propionic acid,
pentaerythritol tetraester of β-mercapto propionic acid,
pentaerythritol tetraester of γ-mercaptobutyric acid, or polythiols such as propanetrithiol and the like and mixtures thereof.

EXAMPLE I 0.1 mole 1,8-octanedithiol and 50 ml. dimethyl sulfoxide were charged to a flask and heated at about 98° C. on a steam bath for 12 hours. Two phases formed which were dissolved in 200 ml. ether. The ether solution was washed twice with 400 ml. portions of water and dried over magnesium sulfate. After stripping the ether solvent a white solid mixed with a little oily liquid was recovered. The solid was separated and analyzed with the following results:

|   | Wt. percent |
|---|---|
| C | 54.6 |
| H | 9.4 |
| S | 36.2 |
| Total | 100.2 |

SH (mercaptan sulfur), 1.73 wt. percent.

From the analysis, $H(SC_8H_{16}S)_xH$ was formed with $x$ having an average value of about 21. The average molecular weight of the compound was calculated at 3700.

EXAMPLE II 176 g. (1 mole) of 4-(2-mercaptoethyl)cyclohexanethiol and 1200 ml. dimethyl sulfoxide were charged to a stirred reactor equipped with a reflux condenser and heated for four hours at 150° C. The unreacted dimethyl sulfoxide with dimethyl sulfide and water formed in the course of the reaction were vacuum flashed. The residue, a tacky, white gum was dissolved in 300 ml. chloroform and washed twice with 500 ml. portions of water. The chloroform solution was dried over magnesium sulfate. After stripping the solvent, 176 g. of a clear, viscous material was recovered. Mercaptan sulfur found: 4.46 weight percent; molecular weight calculated: 1400.

The structural unit of the polymer is represented by

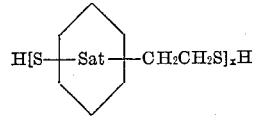

where $x=8$.

As noted, the molecular weight of the polymer will depend somewhat on the residence time. This example was repeated but for two hours only. The molecular weight of the product was about 575.

EXAMPLE III

4 - (2 - mercaptoethyl)cyclohexanethiol containing 1.5 weight percent propanetrithiol was dissolved in dimethyl sulfoxide and heated at 150° C. for three hours. The reaction mixture was then stripped of volatiles at reduced pressure and at 80° C. The residue was dissolved in chloroform and washed once with 800 ml. of a very dilute sulfuric acid solution (to assist in breaking emulsions) and twice with 400 ml. portions of water. The chloroform solution was then dried over anhydrous magnesium sulfate and the chloroform was stripped from the polymer. The polymer had a Brookfield viscosity of 1,176,000 cps., at 22° C., a molecular weight of 875 (U.P. Osmometer), and percent SH=5.14.

150 g. of the polymer, 0.5 g. Cobalt linoresinate (accelerator), 63 g. $PbO_2$ in HB–40, a commercial terpene plasticizer, containing 50 weight percent $PbO_2$ were heat cured and tested according to ASTM D 412–51T.

Tensile strength of the cured material was 423 p.s.i. at 200 percent elongation after 21 days storage.

A well known "Thiokol" polymer of comparable curability was similarly tested. Tensile strength was 143 p.s.i. at 200 percent elongation after 21 days storage.

The excellent result in the curing test shows that these disulfide polymers are useful as adhesives and laminating agents.

EXAMPLE IV 300 g. 4-(2-mercaptoethyl)cyclohexanethiol, 5 g. pentaerythritol tetraester of β-mercapto propionic acid, and 1500 ml. dimethyl sulfoxide were the reagents used in this test.

The dimethyl sulfoxide was preheated to 150° C. in the reaction flask and the dimercaptan-ester mixture added as quickly as possible through a separatory funnel. Heating at 150° C. with stirring was continued for 90 minutes. After cooling, two layers formed which were separated by decanting the dimethyl sulfoxide solution from the dimethyl sulfoxide-insoluble material. This insoluble material was taken up in benzene, washed, dried, stripped of benzene, and analyzed:

Fraction 1—Dimethyl sulfoxide insoluble

| Analysis: | Wt. percent |
|---|---|
| C | 55.6 |
| H | 8.3 |
| S | 36.3 |
| HS | 4.49 |

Mol. wt. 1300.

The resin was a pale yellow, tacky gum which could be cured to a hard plate by the usual curing agents such as lead dioxide.

The dimethyl sulfoxide solution was stripped, taken up in methylene chloride, washed, dried, stripped again, and analyzed:

Fraction 2—Dimethyl sulfoxide soluble

| Analysis: | Wt. percent |
|---|---|
| C | 54.8 |
| H | 8.5 |
| S | 35.1 |
| HS | 10.4 |
| O (by difference) | 1.6 |

The purified material was a viscous oil which can be used as a plasticizer or adhesive adjuvant.

The ratio of product yield Fraction 1:Fraction 2 was 10:1.

The cross-linked products of Example IV contain at least some groups which can be represented by

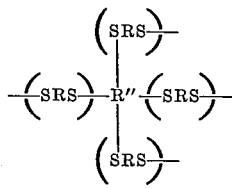

wherein R" is a tetravalent organic radical.

Whether the procedure of the invention is carried out continuously or in batch, copolymers can be obtained by using mixtures of dithiols. It is within the scope of the invention to add different ingredients at different times. Thus, after a reaction has been engendered, it is possible to change the chemical character of the components being added to the reacting mass to obtain different overall structures, as one skilled in the art having studied this disclosure will understand.

Reasonable variation and modification are possible in the scope of the foregoing disclosure of the invention, the essence of which is that disulfide polymers as described are obtained and that the method according to which the polymers are obtained comprises essentially bringing together a dithiol and a dialkyl sulfoxide in a preferred form there being also present for reaction a polythiol or a polyfunctional mercapto ester.

I claim:

1. A process for the production of a disulfide polymer which comprises contacting a dithiol and a dialkyl sulfoxide at an elevated temperature in the approximate range 95–170° C., the dithiol being selected from 4-(2-mercaptoethyl)cyclohexanethiol and 3 - (2-mercaptoethyl)cyclohexanethiol and recovering a polymer thus formed, the proportion of the dithiol to the sulfoxide at the initial onset of reaction being within the approximate range 10–25 weight percent.

2. A process according to claim 1 wherein the sulfoxide is selected from dimethyl-, diethyl-, and methyl ethyl sulfoxide and mixtures thereof.

3. A process for the production of a disulfide polymer which comprises contacting a dithiol and a dialkyl sulfoxide at an elevated temperature, the dithiol being selected from 4-(2-mercaptoethyl)cyclohexanethiol and 3-(2-mercaptoethyl)cyclohexanethiol wherein the temperature is in the approximate range of at least 95–170° C. and wherein the sulfoxide is selected from dimethyl-, diethyl-, and methyl ethyl sulfoxide and mixtures thereof and recovering a polymer thus formed, the proportion of the dithiol to the sulfoxide at the initial onset of reaction being within the approximate range of 10–25 weight percent.

4. A polymer prepared according to the method of claim 3 wherein the molecular weight of the polymer is in the approximate range 575 to 5000 and the polymer is one of a liquid, semi-solid, and rubbery polymer.

References Cited

UNITED STATES PATENTS

| 2,563,133 | 8/1951 | Patrick et al. | 260—79 XR |
| 3,219,638 | 11/1965 | Warner | 260—79 |
| 3,294,760 | 12/1966 | Hay | 260—608 XR |
| 3,376,313 | 4/1968 | Wallace | 260—608 XR |
| 3,389,106 | 6/1968 | Simpson | 260—79 XR |

OTHER REFERENCES

Yiannios et al.: "J. Org. Chem." vol. 28 (1963), pp. 3246–48.

CHARLES B. PARKER, Primary Examiner

D. R. PHILLIPS, Assistant Examiner

U.S. Cl. X.R.

260—79